TRANSDUCER HEAD FOR DUAL SOUND TRACK RECORDING

Filed June 18, 1957 5 Sheets-Sheet 1

Inventor:
AUGUST FREISE
BY [signature]
PATENT AGENT

Dec. 12, 1961 A. FREISE 3,013,126

TRANSDUCER HEAD FOR DUAL SOUND TRACK RECORDING

Filed June 18, 1957 5 Sheets-Sheet 2

Inventor:
AUGUST FREISE

BY [signature]
PATENT AGENT

Dec. 12, 1961 A. FREISE 3,013,126

TRANSDUCER HEAD FOR DUAL SOUND TRACK RECORDING

Filed June 18, 1957 5 Sheets-Sheet 3

INVENTOR
AUGUST FREISE
BY [signature]
PATENT AGENT

Dec. 12, 1961 A. FREISE 3,013,126

TRANSDUCER HEAD FOR DUAL SOUND TRACK RECORDING

Filed June 18, 1957 5 Sheets-Sheet 4

Inventor:
AUGUST FREISE
BY
PATENT AGENT

Dec. 12, 1961 A. FREISE 3,013,126

TRANSDUCER HEAD FOR DUAL SOUND TRACK RECORDING

Filed June 18, 1957 5 Sheets-Sheet 5

Inventor:
AUGUST FREISE

BY [signature]

PATENT AGENT 3,013,126

TRANSDUCER HEAD FOR DUAL SOUND TRACK RECORDING

August Freise, Hannover, Germany, assignor to Telefunken G.m.b.H., Berlin, Germany Filed June 18, 1957, Ser. No. 666,329
Claims priority, application Germany June 21, 1956
7 Claims. (Cl. 179—100.41)

The present invention relates to a mechanical-electrical transducer head for producing or following a groove-type sound track whereon two signals are recorded, preferably different from one another.

Transducer heads have been known by which two sound tracks recorded in a groove of a record disk are simultaneously followed, for example, a depth cut track and a lateral track. Generally, transducers which are used in stereophonic equipment have two oscillatory systems cooperating with a common stylus, said systems being electrically, electromagnetically or mechanically decoupled.

The axes of these two systems are disposed perpendicularly with respect to one another. Thus, bulky physical dimensions result and prior art systems also suffer the disadvantage that the centers of gravity of the systems are not in a common plane of symmetry of the transducer.

It is an object of the present invention to avoid these disadvantages while using a dynamic system.

It is another object of the invention to provide a supporting means, such as a leaf spring, for holding the stylus, which means will transmit substantially only the lateral displacements of the stylus, and to mount the stylus in one end of this supporting means which is mounted at its other end on one end of the pivot shaft of the rotating coil of the first system, whereby the supporting means is located in the plane of symmetry of this first system. The supporting means is then connected at its end adjacent the stylus to the center of the pivot shaft of a rotating coil of the second system via an arm extending transversely from the second shaft, and transmitting substantially only the displacements in the direction of the axis of the stylus, said second pivot shaft being disposed perpendicularly with respect to the first pivot shaft supporting the first rotating coil.

It is a further object of the invention to decrease the height of the transducer by providing for the generation of the magnetic flux for both systems one permanent magnet, or two of them connected in series, and to conduct the magnetic flux through two air gaps provided adjacent the rotating coils and disposed perpendicularly with respect to one another and mutually spaced, one of said air gaps being arranged approximately opposite the center of the other.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
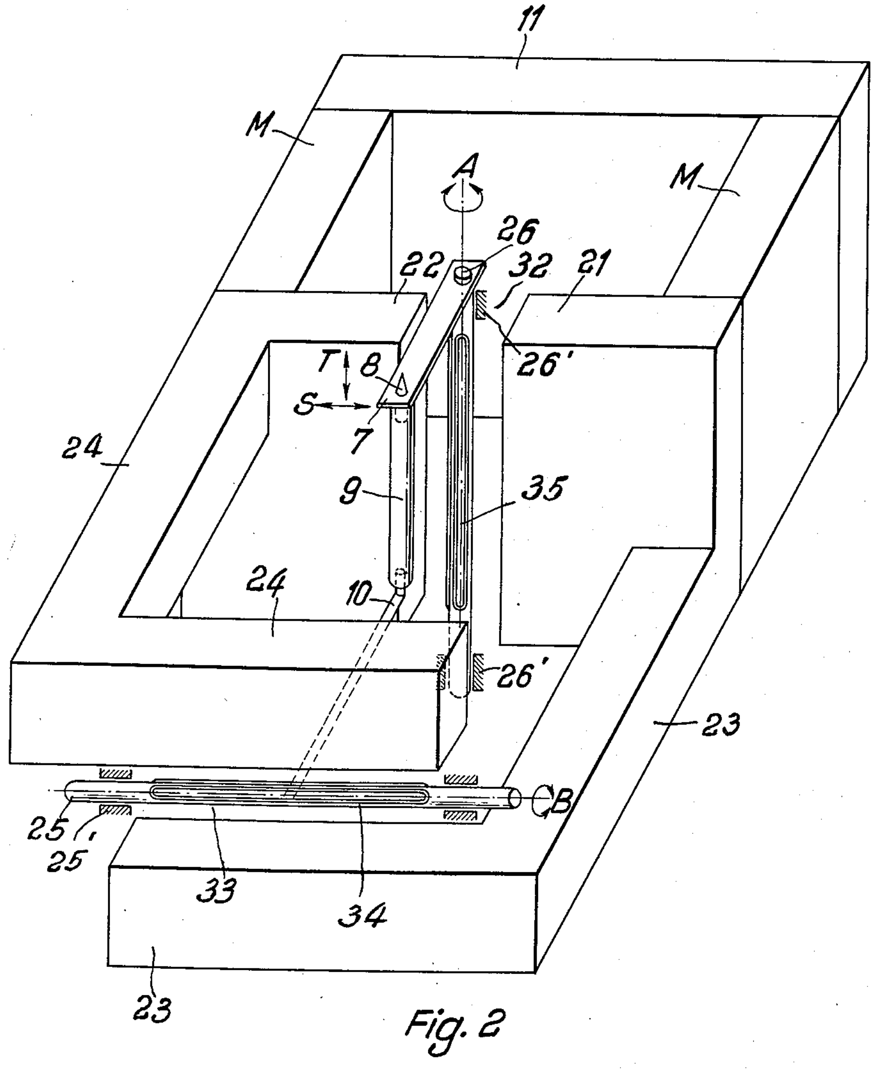
FIGURE 2 shows also schematically a modified form of the invention wherein the two dynamic systems are embodied in a single structural unit.
Figure 2A:
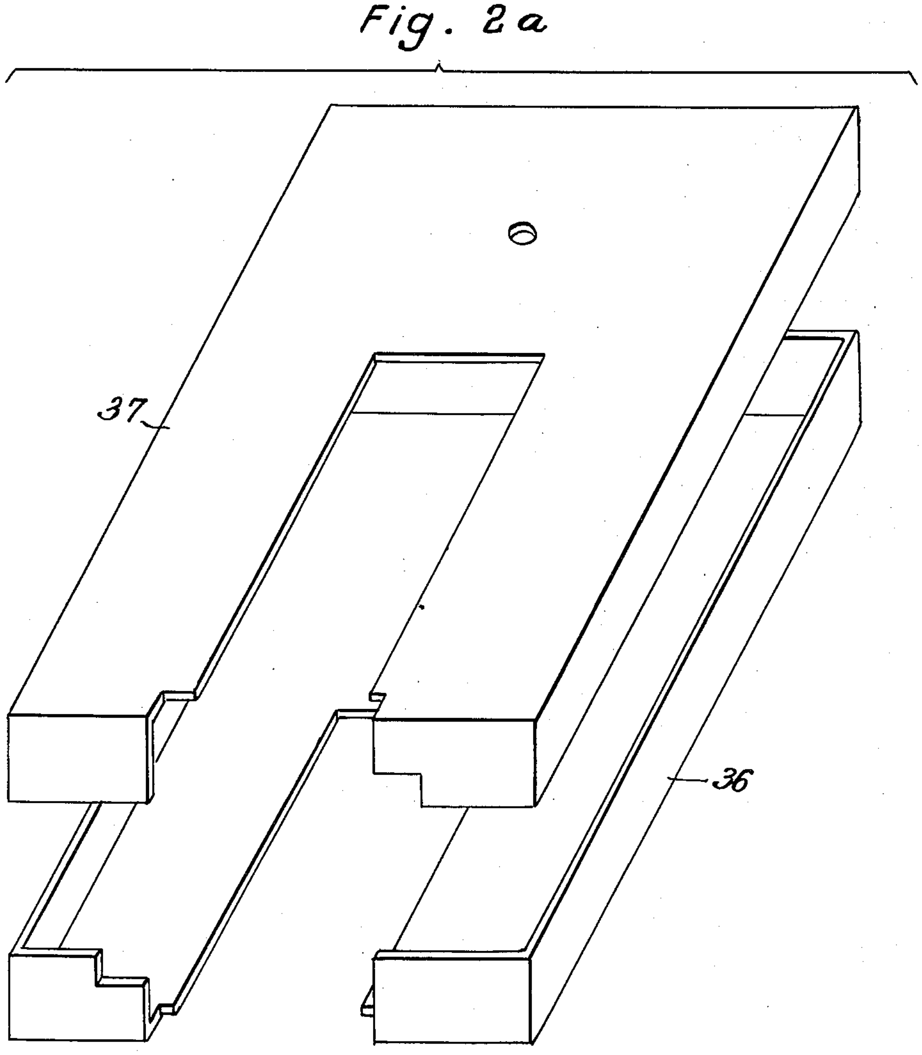
Figure 3:
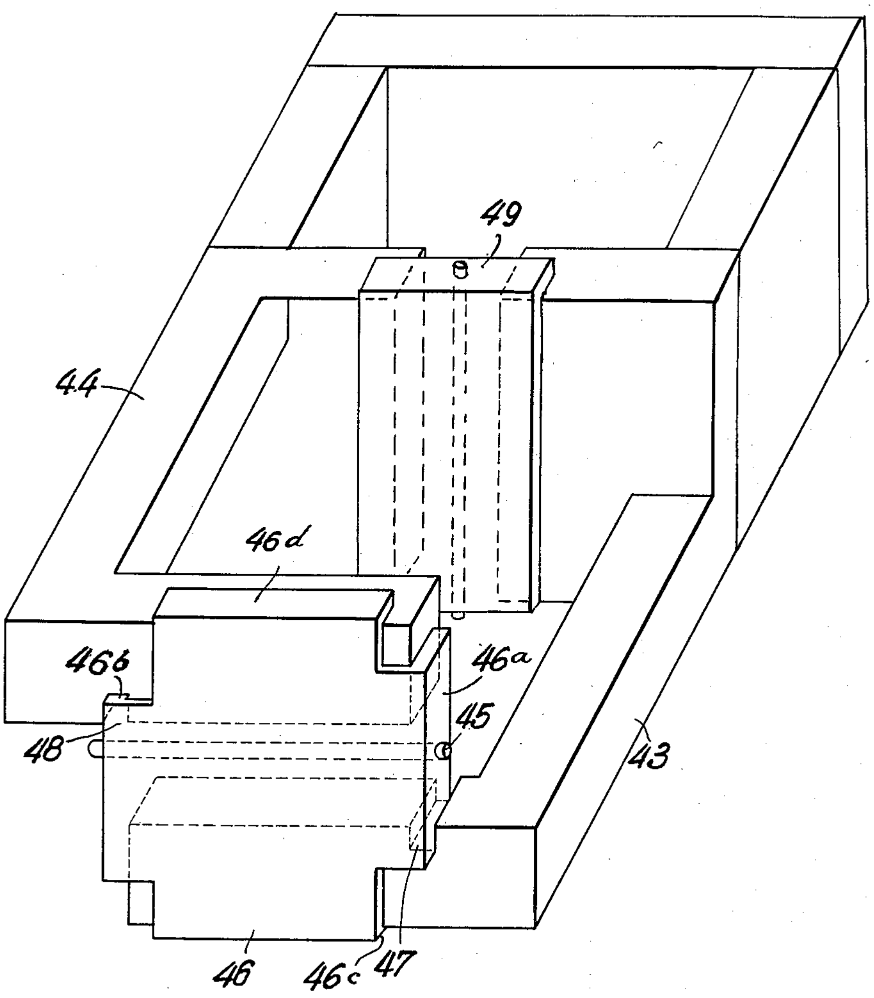
Figure 4:
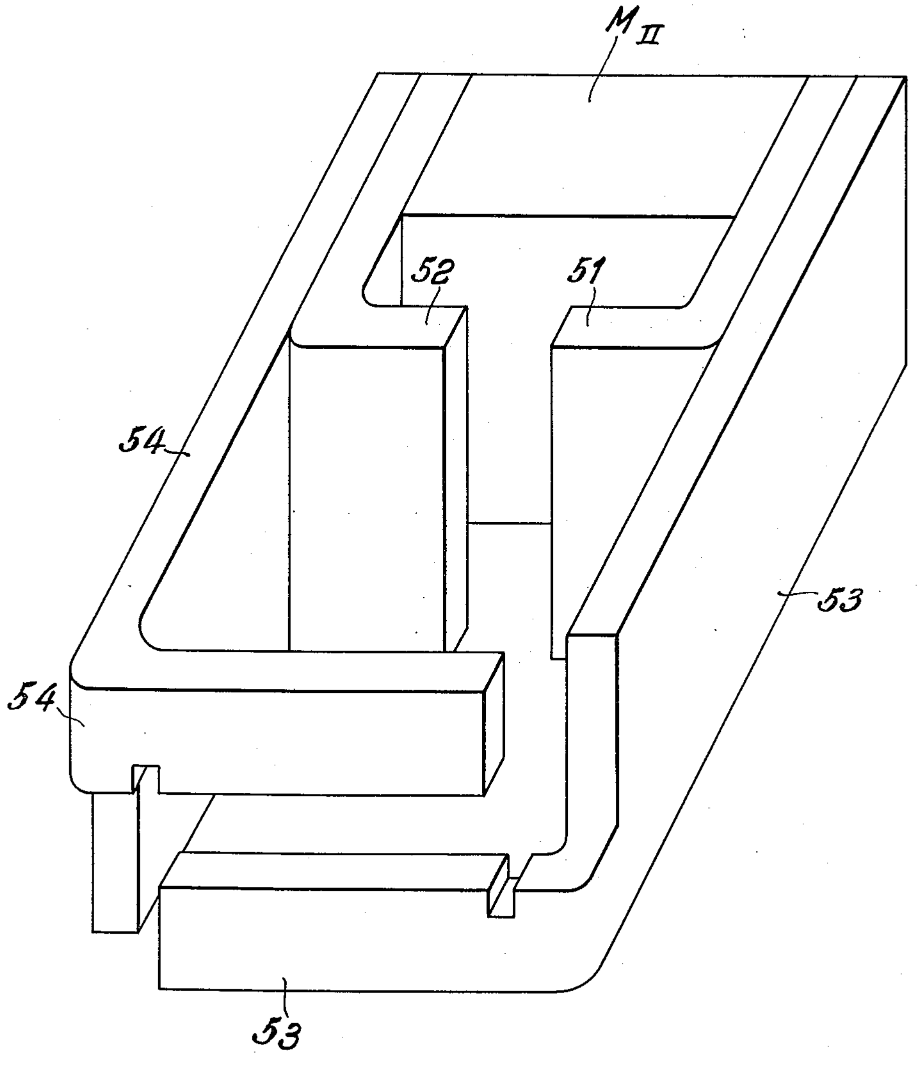

FIG. 2*a* shows schematically a housing for the magnetic system;

FIGURE 3 shows schematically an arrangement for mounting of the second pivot shaft;

FIGURE 4 is a still further modification of the structural unit according to FIGURE 2, showing only the arrangement of the stationary magnetic members.

Figure 1:
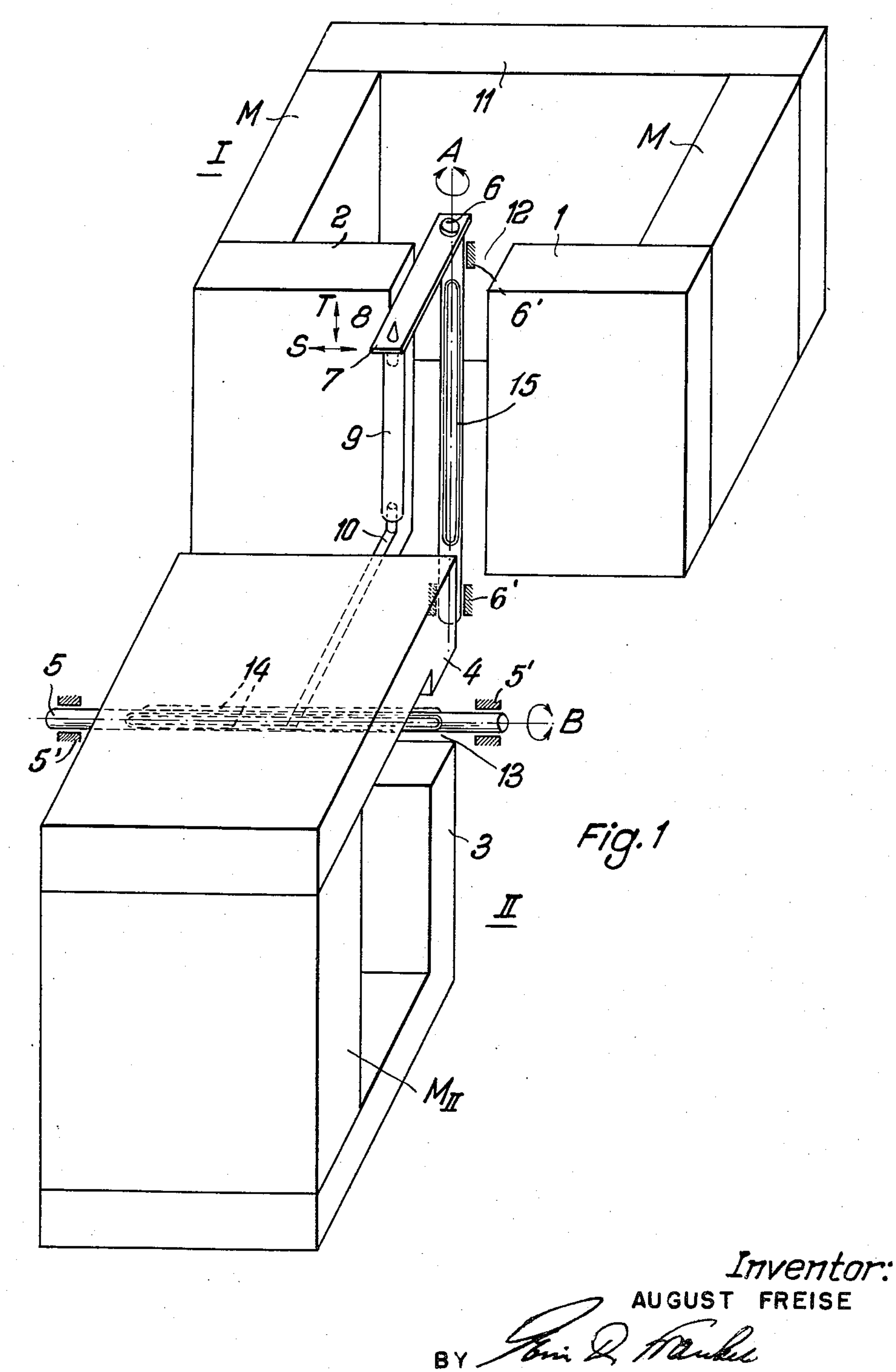
FIGURE 1 shows schematically an embodiment of a transducer according to the invention, having two separate magnetic systems.

Referring more particularly to FIGURE 1, the two dynamic systems are denoted by I and II. The first system I comprises a rectangular bar 11 of permeable material forming the rear of the system. Two permanent magnets M are disposed at opposite ends of the bar 11 at right angles thereto, whereby these permanent magnets are in series magnetically with respect to the bar 11, whereby a U-shaped yoke is obtained. Pole pieces 1 and 2 are located at the free ends of the permanent magnets M and parallel with respect to the bar 11. A vertical air gap 12 is formed between the pole pieces 1 and 2. A pivot shaft 6 supports a movable coil 15, for example, wound on a former in a manner known per se. The entire magnetic system I is held together in a housing (not shown) of non-magnetic material, for example, synthetic or plastic material. The pivot shaft 6, extending beyond the air gap 12 at the top and the bottom, is journalled in bearings 6′ in this housing, a suitable mounting for this shaft being described with reference to FIGURE 3. A stylus supporting member 7, comprising a leaf spring, is mounted on one end of the pivot shaft 6 which projects from its bearing 6′, said end being shown at the top in FIGURE 1, because the transducer is illustrated inverted from its working position. The pivot shaft 6 and the stylus supporting member or leaf spring 7 are connected in such a manner, that the other end of the supporting member 7, carrying the stylus, extends perpendicularly with respect to the pole pieces beyond the magnetic system I. The end of the supporting member 7 adjacent the stylus is connected to the pivot shaft 5 of the system II via linking elements 9, 10, hereinafter described in greater detail.

The system II is designed similarly to system I, and is arranged perpendicularly and symmetrically with respect to the latter. A magnetic flux is produced in the system II by a permanent magnet $M_{II}$, the position of which corresponds to that of the rear bar 11 in the system I. In place of the magnet $M_{II}$, two permanent magnets as in system I may be provided. Pole pieces 3 and 4 of the system II are disposed adjacent to the magnet $M_{II}$ and at right angles thereto, and form a horizontal air gap 13 in which the pivot shaft 5 is symmetrically journalled in bearings 5′. The magnet $M_{II}$ is of such size that approximately the same flux density is present in the air gap 13 of the system II as in the air gap 12 of the system I. The air gap 13 is not located in the plane of symmetry of the magnetic yoke of the system II, the pole piece 4 adjacent the stylus being shorter than the pole piece 3. As a result of this, the linking element 9 can be made shorter in order to increase its resistance to axial distortion. The system II is likewise held together by a similar housing (not shown), in which the shaft 5 is journalled.

The symmetrical arrangement of these two systems with respect to one another is made possible in accordance with the invention by attaching the linking element 10 to the center of the pivot shaft 5. This is accomplished in a very simple manner by providing the linking element 9 in form of a tube of resilient material, such as polyvinyl chloride, whereby one end of this tube 9 is telescoped over the end of the stylus 8 which extends through the stylus supporting member or leaf spring 7, while the other end of the tube 9 is telescoped over the bent end of the arm or element 10, the other end of which is secured to the center of the pivot shaft 5, i.e., the latter end is inserted in a hole through the center of this shaft 5.

The system I serves to follow, for example, a lateral sound track. A deflection of the stylus 8 in the direction of the arrows S results in a rotation of the pivot shaft 6 in the direction of the arrows A. The system II is substantially uninfluenced by this displacement, because the tube 9 is resilient transversely of the direction of its axis. The system II serves to follow, for example, a depth cut track, i.e., when the stylus 8 is deflected in the direction of the arrows T, the shaft 5 is turned in the direction of the arrows B. Due to the resilience of the stylus supporting member or leaf spring 7 in the direction of the arrows T, influencing of the system I is prevented.

In the modification shown in FIGURE 2, the two magnetic systems are combined in one structural unit. Such design has the advantage that the dimensions of the entire system are considerably decreased, which is particularly important where the system is used in record changers. The bar 11 and pole pieces 21 and 22, forming an air gap 32 of the first system, are adjacent the magnets M as in FIGURE 1. However, pole piece 21 is joined to pole piece 23, and pole piece 22 to pole piece 24 of the second system. The pole pieces 23 and 24 are L-shaped and are arranged in such a manner that their outer legs, disposed parallel to the pole pieces 21 and 22, form an air gap 33 running approximately centered across the front of the equally large air gap 32 of the first system, although perpendicular with respect to this air gap 32. The disposition of the elements and their operation is the same as in FIGURE 1, except that the flux appearing at both air gaps is produced by a common set of magnets. The entire magnetic system is held together by a non-magnetic housing (as shown in FIG. 2*a*) in which pivot shafts 25 and 26 of rotating coils 34 and 35 are journalled in bearings 25′ and 26′, respectively.

A detailed mounting of a pivot shaft denoted by 45 is illustrated in FIGURE 3, wherein a supporting member 46 of non-magnetic material forming a flat plate is provided with four side flanges 46*a*, 46*b*, 46*c* and 46*d*, each at right angles to the plate 46. The ends of the pivot shaft 45 are respectively journalled in two of the oppositely disposed flanges 46*a* and 46*b*. This plate 46 is placed at the front end of pole pieces 43 and 44, whereby the flanges 46*a* and 46*b*, supporting the shaft 45, engage recesses 47 and 48 respectively of the pole pieces 43 and 44. The widths of these recesses 47 and 48 correspond to the thickness of the flanges, so that the latter are firmly lodged therein. The other two flanges 46*c* and 46*d* arranged opposite one another are seated on the faces of the pole pieces 43 and 44, so that the position of the plate 46 is positively determined.

The position of the other pivot shaft in the air gap of the first system is assured by providing a similarly designed supporting member 49. The housing (FIG. 2*a*), holding together the entire magnetic system and comprising, for example, two parts, i.e., a bottom 36 and a cover 37, is designed in such a manner that the plates supporting the two pivot shafts are lodged in the housing. The lid and bottom of the housing are subsequently joined by means of bolts.

FIGURE 4 shows a further modification of the magnetic system having advantages mainly with respect to cost of manufacture. While in the embodiment of FIGURE 2, the pole pieces have to be milled and ground, the pole pieces of FIGURE 4 can be individually punched or stamped from permeable material and subsequently bent, so that only the faces forming the air gaps have to be machined. Only two operations are involved in this case when the pole pieces are symmetrically designed. Pole pieces 51 and 52 are suitably joined to the pole pieces 53 and 54, respectively, prior to their insertion in the housing (FIG. 2*a*), by means of threaded bolts.

In case of mass production, it is recommended to manufacture the entire magnetic system employing sintering in the making of the pole pieces.

The transducers shown and described may be used as both pick-ups or as cutter members for recording of stereophonic sound on disk records. The invention is not limited to a record having a depth cut track and a lateral track, i.e., the transducer may be modified in such a manner that other dual-coordinate systems may be followed or recorded, wherein the deflection displacements are 90° with respect to one another, but are disposed 45° with respect to the plane of the record.

I claim:

1. A transducer for following a recording groove by means of a single stylus, said groove having two separate mutually perpendicular undulating sound tracks, said transducer comprising two pairs of magnetic poles each pair having an air gap and said gaps being spaced from each other; a permanent magnet member magnetically coupled to said pairs of poles and common to both; a coil supporting pivot shaft journalled in each air gap in mutually perpendicularly spaced relation; a stylus; a stylus support attached to the stylus at one end and to the first of said shafts at its other end, the support being yieldable in one direction to permit the stylus end of the support to yield in the axial direction of the first shaft but to retain mechanical coupling to the first shaft in the circumferential direction thereof, and the stylus and the first shaft substantially occupying a common plane intersecting at right angles the axis of the second of said shafts substantially at the center thereof; and linkage members connected between the stylus end of said support and the second shaft and yieldable circumferentially of the first shaft and in the direction of the axis of the second shaft but mechanically coupled to rotate the latter shaft in response to motions of the stylus end of the support in directions axial of the first shaft.

2. In a transducer according to claim 1, said stylus support comprising a leaf spring having said stylus and said first shaft passed therethrough and fixed thereto in mutually parallel spaced relation, the leaf spring substantially occupying said common plane.

3. In a transducer according to claim 1, said poles comprising magnetic iron pieces stamped from sheet metal and bent to face each other when secured to said permanent magnet members.

4. In a transducer according to claim 1, said linkage members comprising two members joined at adjacent ends to each other, the first member being disposed parallel to the first shaft and connected at its other end to the stylus end of said support, and the second member being connected at its other end to said second shaft in mutually perpendicular relation therewith, and said members lying substantially in said common plane.

5. In a transducer according to claim 4, said second member having at its end adjacent said first member a rod portion bent 90° and extending toward said stylus, and said first member comprising a resilient tube joined to one end of the stylus and to the rod portion of the second member by being telescoped thereover.

6. In a transducer according to claim 5, said tube being made of synthetic plastic material.

7. In a transducer according to claim 6, said material being polyvinyl chloride.

References Cited in the file of this patent

UNITED STATES PATENTS

| | | |
|---|---|---|
| 1,773,601 | Rogers | Aug. 19, 1930 |
| 1,855,151 | Jones | Apr. 19, 1930 |
| 2,114,471 | Keller et al. | Apr. 19, 1938 |
| 2,743,110 | Freiberg | Apr. 24, 1956 |

FOREIGN PATENTS

| | | |
|---|---|---|
| 1,003,463 | Germany | Feb. 28, 1957 |
| Kl42g | | |